United States Patent [19]

Choi et al.

[11] Patent Number: 5,780,821
[45] Date of Patent: Jul. 14, 1998

[54] METHOD OF CONTROLLING FOOD THAWING AND COOKING OPERATIONS OF A MICROWAVE OVEN

[75] Inventors: Won-Woo Choi; Seok-Weon Hong, both of Suwon, Rep. of Korea

[73] Assignee: Samsung Electronics Co., Ltd., Suwon, Rep. of Korea

[21] Appl. No.: 803,130

[22] Filed: Feb. 21, 1997

[30] Foreign Application Priority Data

Feb. 23, 1996 [KR] Rep. of Korea .................... 1996-4366

[51] Int. Cl.$^6$ .................................................. H05B 6/68
[52] U.S. Cl. .................. 219/703; 219/708; 219/702; 219/715; 99/325; 426/524
[58] Field of Search .................... 219/702, 703, 219/704, 705, 707, 708, 715; 99/325; 426/233, 241, 243, 524

[56] References Cited

U.S. PATENT DOCUMENTS

| | | |
|---|---|---|
| 4,599,503 | 7/1986 | Ueda . |
| 4,615,405 | 10/1986 | Morino et al. . |
| 4,705,926 | 11/1987 | Sakai et al. ........................... 219/703 |
| 4,895,067 | 1/1990 | Ohji et al. . |
| 5,352,874 | 10/1994 | Gong ..................................... 219/704 |
| 5,436,433 | 7/1995 | Kim et al. ............................. 219/707 |
| 5,496,576 | 3/1996 | Jeong ..................................... 219/707 |
| 5,506,390 | 4/1996 | Seo . |
| 5,545,880 | 8/1996 | Bu et al. ............................... 219/703 |
| 5,548,103 | 8/1996 | Morita ................................... 219/703 |

FOREIGN PATENT DOCUMENTS

| | | |
|---|---|---|
| 62-87066 | 4/1987 | Japan . |
| 63-254326 | 10/1988 | Japan . |
| 6-64013 | 9/1994 | Japan . |

*Primary Examiner*—Philip H. Leung
*Attorney, Agent, or Firm*—Burns, Doane, Swecker & Mathis, L.L.P.

[57] ABSTRACT

A microwave oven includes a cooking chamber, a tray disposed in the cooking chamber upon which food can be placed, and a magnetron for supplying high frequency waves to the cooking chamber. The microwave oven has a food-thawing mode and a food-cooking mode. In the thawing mode, the oven is capable of bringing food to different states of thawing in response to the selection of a specific food-thawing key. In the food-cooking mode, various cooking levels can be selected.

7 Claims, 6 Drawing Sheets

METHOD OF CONTROLLING FOOD THAWING AND COOKING OPERATIONS OF A MICROWAVE OVEN

FIELD OF THE INVENTION

The present invention generally relates to methods of controlling the operation of a magnetron of a microwave oven during food thawing and cooking operations.

BACKGROUND OF THE INVENTION

The following description concerns the prior art.

First, U.S. Pat. No. 5,506,390 relates to a thawing control apparatus and method for a microwave oven. According to the '390 Patent, an optimum food-thawing time can be fixed, despite unexpected voltage variation from an input alternating current source.

Japanese Utility Model Publication (unexamined) No. 94-64013 (filed on Feb. 16, 1993) discloses a microwave oven that includes a cooking chamber, a food-supporting tray, a motor, and a reversible driving means. The driving means passes through the cooking chamber's middle section. The tray is mounted on the floor of the cooking chamber, and is connected to the motor so that it is elevated by the operation of the motor and then caused to rotate. If the motor is reversed, the driving means stops the rotation and moves the tray back down to the initial predetermined position. In this manner, the microwave oven is convenient to use.

U.S. Pat. No. 4,615,405 and Japanese Laid-Open Patent Publication 96-320123 disclose microwave ovens having a food supporting tray and a weight sensor for sensing the weight of food on the tray. The U.S. Patent discloses that the cooking time period is calculated at a function of the sensed food weight.

U.S. Pat. No. 4,599,503 discloses establishing a thawing energy level in accordance with the weight of the food. The thawing is performed initially at a high energy level and then at a low energy level.

U.S. Pat. No. 4,895,067 discloses measuring the weight of food during cooking to control the cooking based upon weight variation.

Japanese Patent Publication (unexamined) No. Sho.62-87066 (filed on Apr. 10, 1987) discloses a microwave oven with a device for preventing erroneous operation by displaying an error when a controller detects that no foodstuff has been placed on a tray located in the cooking chamber. The weight of the tray per se is stored in the controller beforehand, so that any measured weight above the stored weight represents the weight of food on the tray. If the rotatable tray and a mounting plate have not been correctly placed on the weight sensor, an oscillator generates to a microcomputer (micom) a signal whose frequency is indicative of a weight sensor's 0 gram reading. The micom compares the oscillator's output value with a weight value stored in the micom, and determines that the rotatable tray and the mounting plate have not been correctly been placed on the weight sensor and displays "error" on a display screen.

A conventional microwave oven will be now described with reference to the accompanying FIG. 6 which depicts a vertical sectional view of the conventional oven. The conventional microwave oven includes a metallic cabinet 10, a cooking chamber 11, a magnetron (not illustrated) which emits high-frequency microwaves to the cooking chamber 11, and a high voltage generator 13 which supplies high

2 voltage to the magnetron. An electric resistance heater 17 is mounted on the upper portion of the cooking chamber 11 to cook foodstuffs in the cooking chamber 11 by radiant heat and convective heat. A food-supporting tray 12 is provided on the floor of the cooking chamber, and is designed to be moved up and down and rotated about a vertical axis.

The above microwave oven also includes a shaft 31 having an upper end connected with the bottom of the tray 12 and a lower end extending downward to the outside of the cooking chamber 11. An elevation guide member 34 is positioned under the shaft 31 to elevate the shaft 31 and the tray. A motor 32 rotates the shaft 31 by means of a gear 32a. A weight sensing portion 35 is provided under the elevation guide member 34 for measuring the weight of foodstuff disposed on the tray 12.

The following description relates to the operation of the above microwave oven.

Generally speaking, if microwaves of about 2,450 MHz in frequency are applied to a food, molecules of the food are motivated by microwave energy so the food emits heat. A microwave oven is an oven that uses microwave heating for fast cooking of meat and other foods.

When the magnetron emits microwaves of about 2,450 MHz into the metallic cabinet 10, molecules of the food are each charged positively and negatively. That is, one side of each of the molecules is negatively charged by the positive electrons of the electric field created by the microwaves, and the other side of each of the molecules is positively charged by the negative electrons of the electric field. Since the electric field's polarity is changed 2.4 billion, 5 thousand times per second, the food's molecules collide with each other to thereby create friction heat so that the food is heated up.

The oven is also a convection microwave which has a cooking function employing radiant heat and convective heat produced by the electric heater 17.

Foodstuffs put on the tray 12 are to be cooked as the tray 12 rotates about a vertical axis after the tray has been elevated. An elevator motor 33 is provided to move the elevation guide member 34 to the right and left between two positions in order to lower and raise the tray, respectively. The microwave oven performs fast cooking of foods either by microwave energy or heat, and the movement of the tray can be performed during either of those cooking operations.

Figure 6:
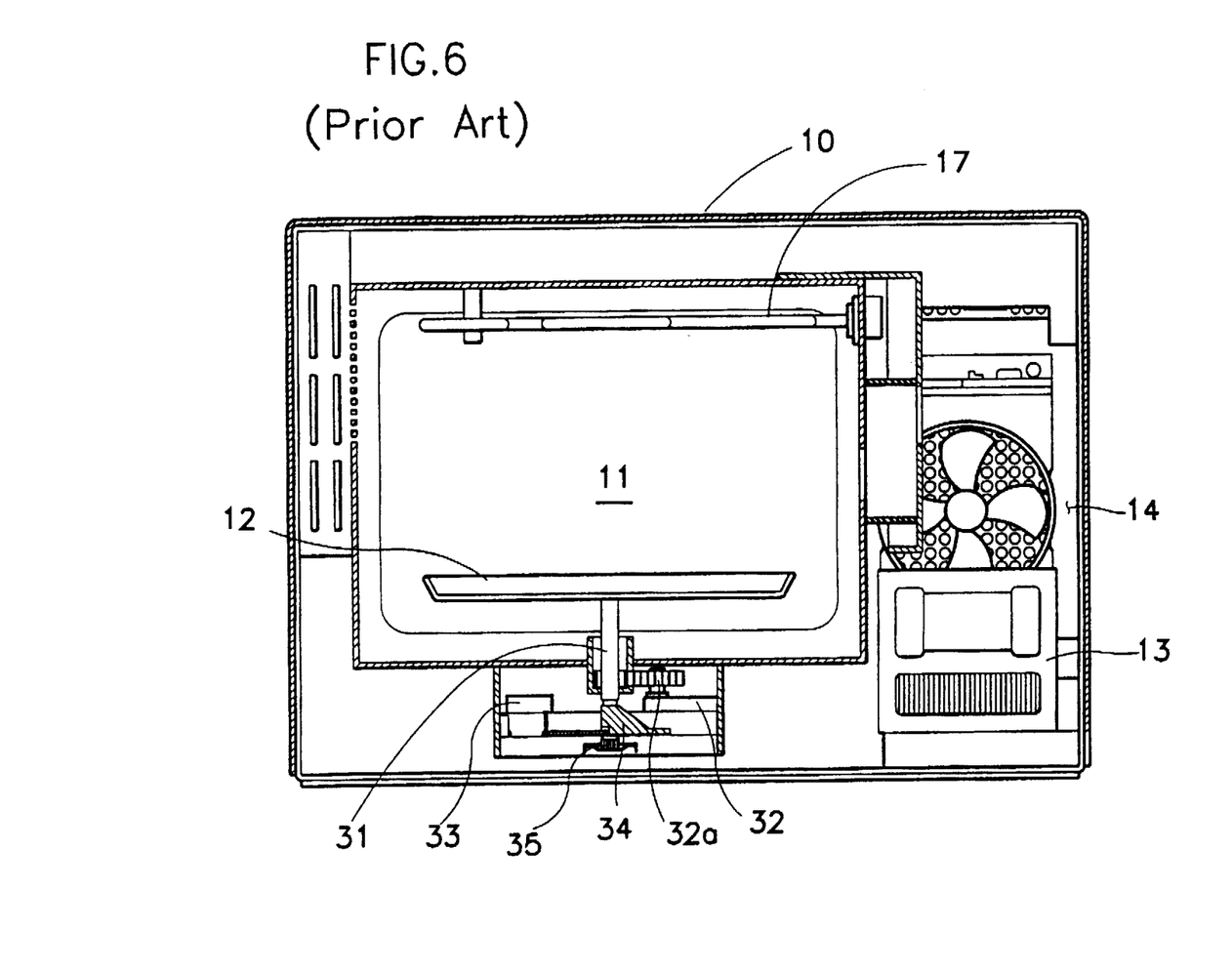
FIG. 6 is a vertical sectional view through a conventional microwave oven.

If a user selects grill mode, barbecue mode or pizza-baking mode, by pressing appropriate buttons on an operation panel (not illustrated), the heater 17 is energized, and the guide member 34 is shifted to the FIG. 6 position to elevate the tray 12 to a predetermined height. Then, the tray 12 begins to rotate, and the cooking is performed.

When it comes to thawing foodstuffs with the conventional microwave oven, the operation of the magnetron is controlled by a thawing time proportional to the weight of a food item. There may be various thawing states of the food that users may want to achieve. For example, they may want the frozen foodstuffs to either become soft enough to be cut well by a knife or merely devoid of ice. According to the conventional microwave oven, however, only a single thawing state of the food is attainable, and the thawing time for attaining that single thawing state is determined according to the weight of the food. Hence the microwave oven is not as versatile as may be desired by users.

SUMMARY OF THE INVENTION

The present invention relates to a method of controlling a food-thawing operation of a microwave oven, the oven including a cooking chamber, a magnetron, and manual input means for selecting among various food-thawing states, including a standard food thawing state. The method comprises the steps of a. determining whether a thawing mode has been selected by a user;
b. determining whether a food-thawing state has been selected by the user when a thawing mode has been selected in step A;
c. setting a standard thawing parameter for achieving a standard food-thawing state when a standard food-thawing state is selected in step B;
d. varying the standard thawing parameter for achieving a different food-thawing state than the standard food thawing state if such different food thawing state is selected in step B; and
e. energizing the magnetron to perform a food thawing operation until the thawing parameter for achieving the food-thawing state selected in step B is reached.

The standard food-thawing parameter may comprise a thawing time period, whereby step D includes terminating the thawing operation when a thawing time period for achieving the thawing state selected in step B has elapsed.

The microwave oven may include a weight sensor for sensing the weight of food to be thawed. The standard thawing parameter in that event would comprise a variation in weight of the food being thawed, and step D would comprise monitoring a weight of the food during the thawing operation and terminating the thawing operation when a weight variation in the food for achieving the thawing state selected in step B is detected.

Another aspect of the invention involves a method of controlling a food cooking operation of a microwave oven, the oven including a cooking chamber, a magnetron, and a manual input means for selecting from among various food cooking levels, including a standard cooking level. The method comprises the steps of:

A. determining whether a microwave cooking mode has been selected;
B. determining whether a cooking level has been selected when a microwave cooking mode has been selected in step A;
C. setting a standard cooking level when a standard cooking level has been selected in step B, wherein the magnetron is energized for only a portion of a cooking period;
D. varying the portion of the cooking period during which the magnetron is energized, when a non-standard cooking level is selected in step B; and
E. energizing the magnetron to perform a food-cooking operation.

BRIEF DESCRIPTION OF THE DRAWING

The objects and advantages of the invention will become apparent from the following detailed description of preferred embodiments thereof in connection with the accompanying drawing in which like numerals designate like elements and in which.

DETAILED DESCRIPTION OF PREFERRED EMBODIMENTS

Preferred embodiments of the present invention will be described in detail with reference to the accompanying drawings.

Figure 1:
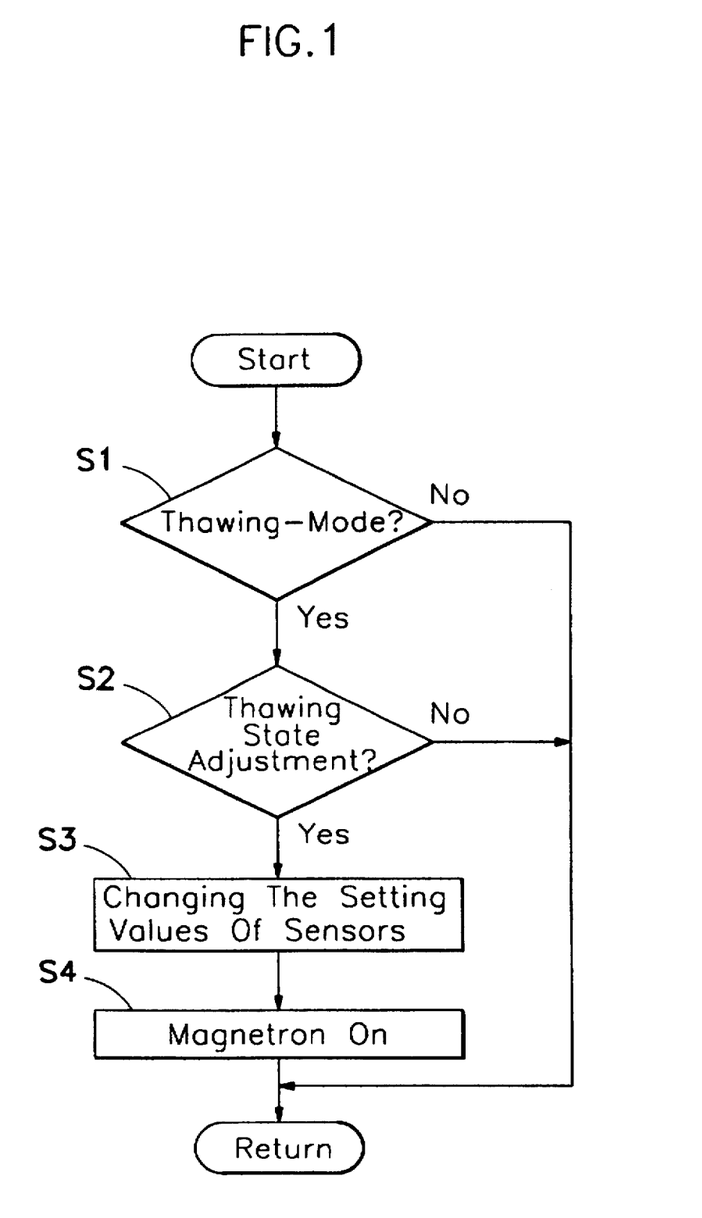
FIG. 1 is a flow chart of the control sequence of a microwave oven in a thawing mode in accordance with the present invention.
Figure 2:
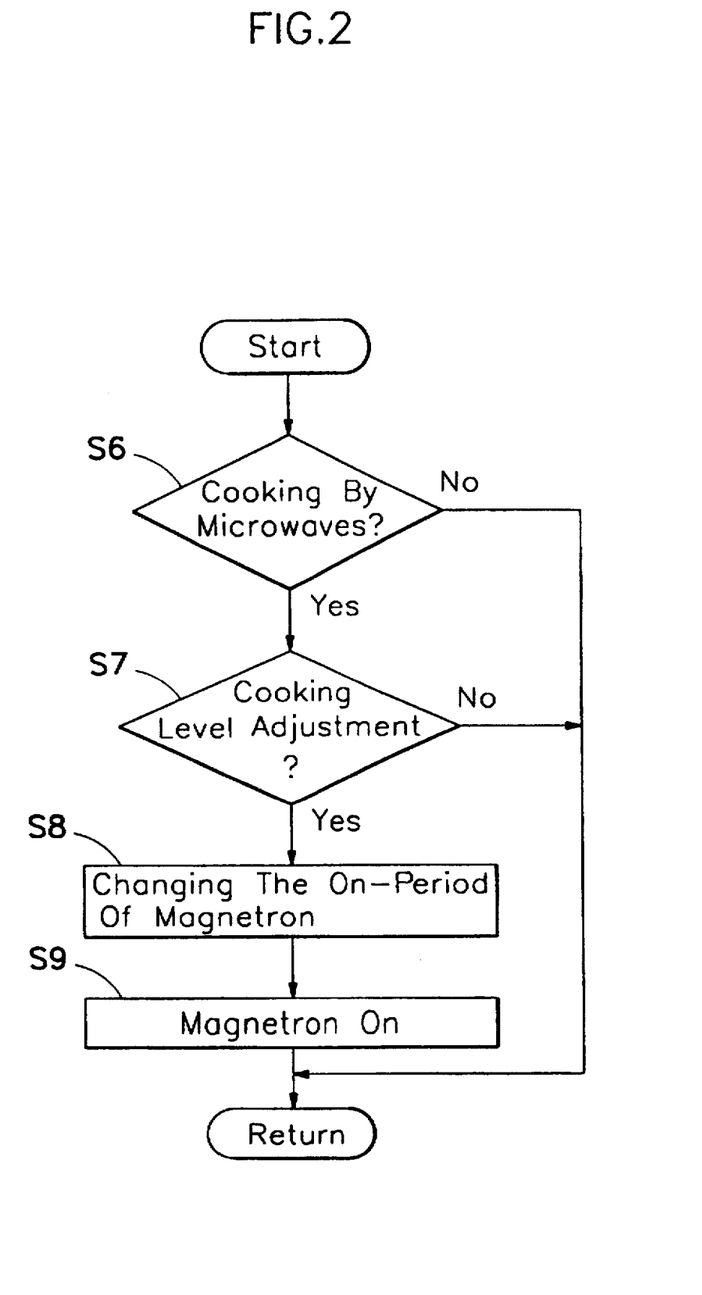
FIG. 2 is a flow chart of the control sequence of a microwave oven in a cooking mode in accordance with the present invention.
Figure 3:
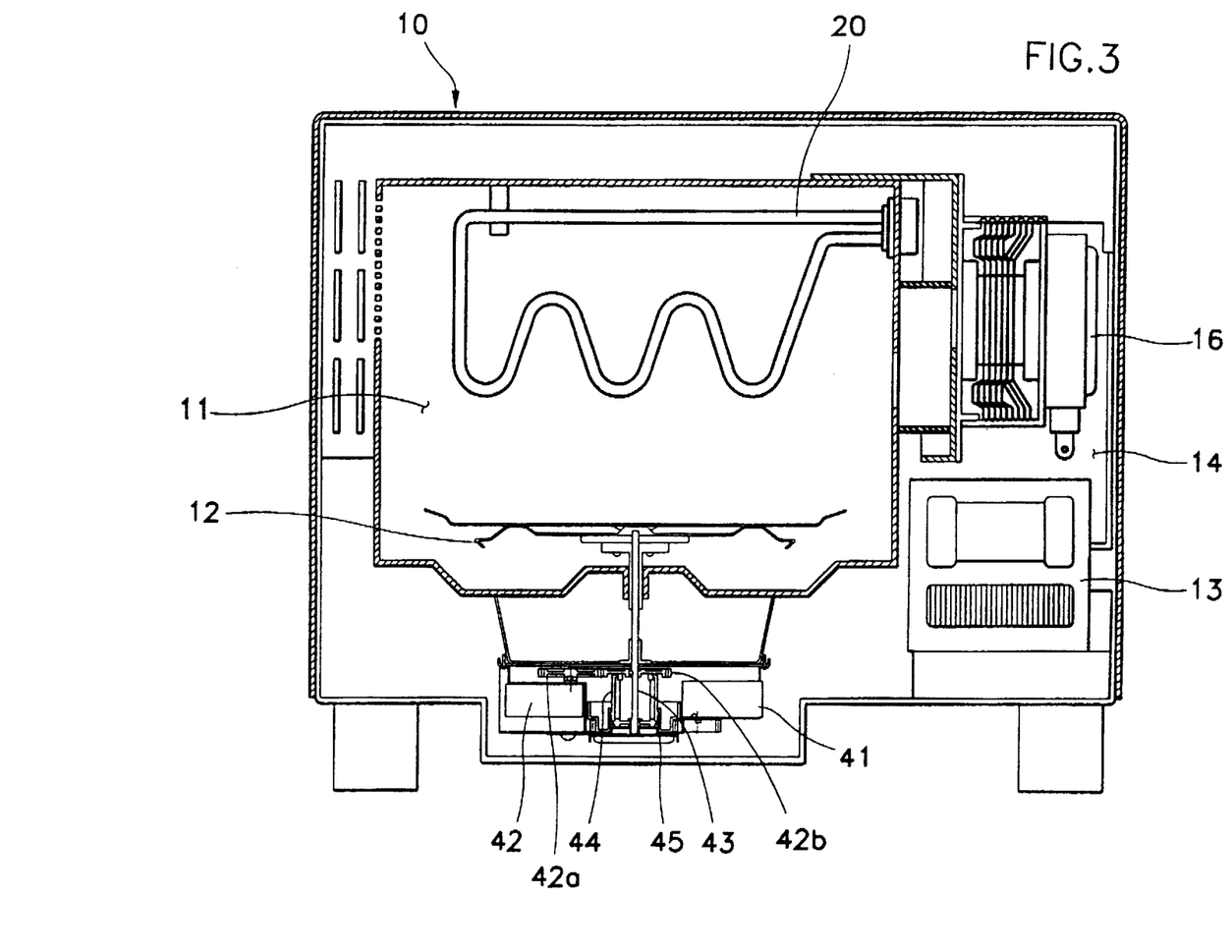
FIG. 3 is a vertical sectional view through a microwave oven in accordance with the present invention.

As shown in FIG. 3, a microwave oven includes a cooking chamber 11, a magnetron 16 which is provided in an electrical component compartment 14 to emit high-frequency microwaves to the cooking chamber 11, and a high voltage generator 13 which supplies high voltages to the magnetron 16. An electric resistance heater 20 is mounted on the upper portion of the cooking chamber 11 to cook foodstuffs in the cooking chamber 11 by radiant heat and convective -heat. A food-supporting tray 12 is provided near the floor of the cooking chamber 11, and is designed to be rotated about a vertical axis and to be elevated.

The above microwave oven also includes a shaft 43 having an upper end connected with the bottom of the tray 12 and a lower end extending downward to the outside of the cooking chamber 11. A motor 42 delivers torque to a rotary gear 42a which meshes with a gear 42b so as to rotate the shaft 43 and the tray 12. An elevation mechanism 44, actuated by a motor 41, is positioned under the shaft 43 to raise and lower the shaft and tray. The shaft 43 is connected to the gear 42b by a spline, to permit the shaft 43 to move vertically relative to the gear.

The elevation mechanism 44 preferably corresponds to that disclosed in commonly assigned, copending application U.S. application Ser. No. 08/664,665, filed Jun. 17, 1996, and now U.S. Pat. No. 5,672,291 the disclosure of which is incorporated herein by reference.

A conventional weight sensing mechanism 45 is provided for weighing the tray 12 and food thereon. By then subtracting the known weight of the tray and shaft, the food weight can be determined. Any suitable mechanism 45 can be utilized, such as that disclosed in the aforementioned U.S. Pat. 4,615,405 and Japanese Laid-Open Publication 96-320123, the weighing mechanism 45 being engaged by the shaft 43 when the tray is in its lowermost position, to enable the weighing to be performed.

The following description relates to the control circuit of the microwave oven in accordance with the present invention.

Figure 4:
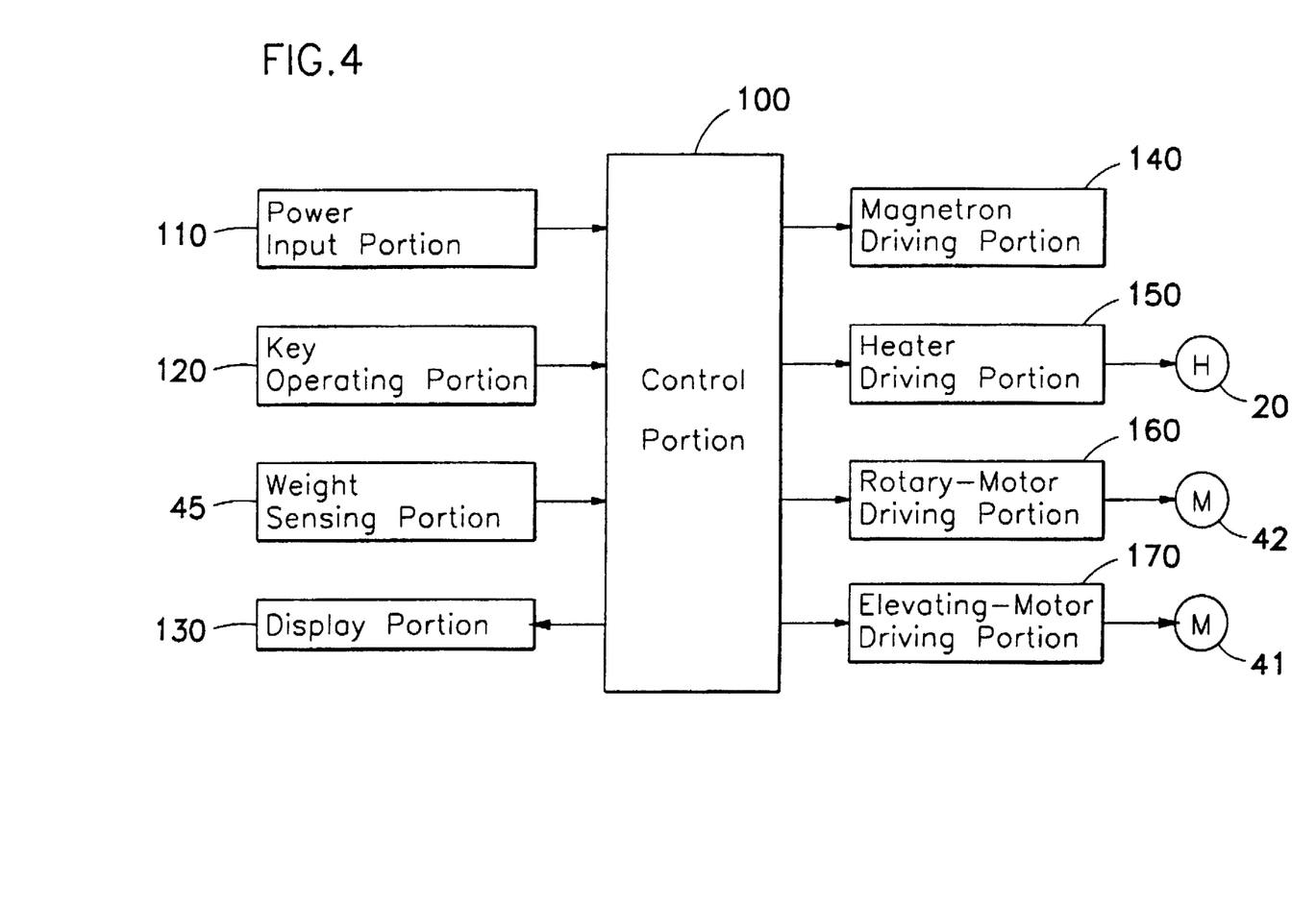
FIG. 4 is a block diagram of a control circuit for a microwave oven in accordance with the present invention.

Referring to FIG. 4, the main control circuit of the microwave oven includes a control portion 100 which controls the overall operation of the microwave oven from the start of cooking to the completion of the cooking, a power input portion 110 which furnishes the control portion 100 with the proper electric voltages and currents for its operation, a manual key operating portion 120 used to input to the oven a desired cooking mode and cooking time. A display portion 130 displays various messages and cooking conditions during operation, and a heater driving portion 150 controls the microwave oven's heater 20.

The control circuit of the microwave oven also includes a magnetron driving portion 140 which controls the magnetron 16, an elevating motor driving portion 170 that controls the elevating motor 41 for elevating the tray 12 under the control of the control portion 100, a rotary motor driving portion 160 that controls the operation of the motor 42 for rotating the tray 12, and the weight sensing mechanism 45 which measures the weight of the foodstuff on the tray 12.

Figure 5:
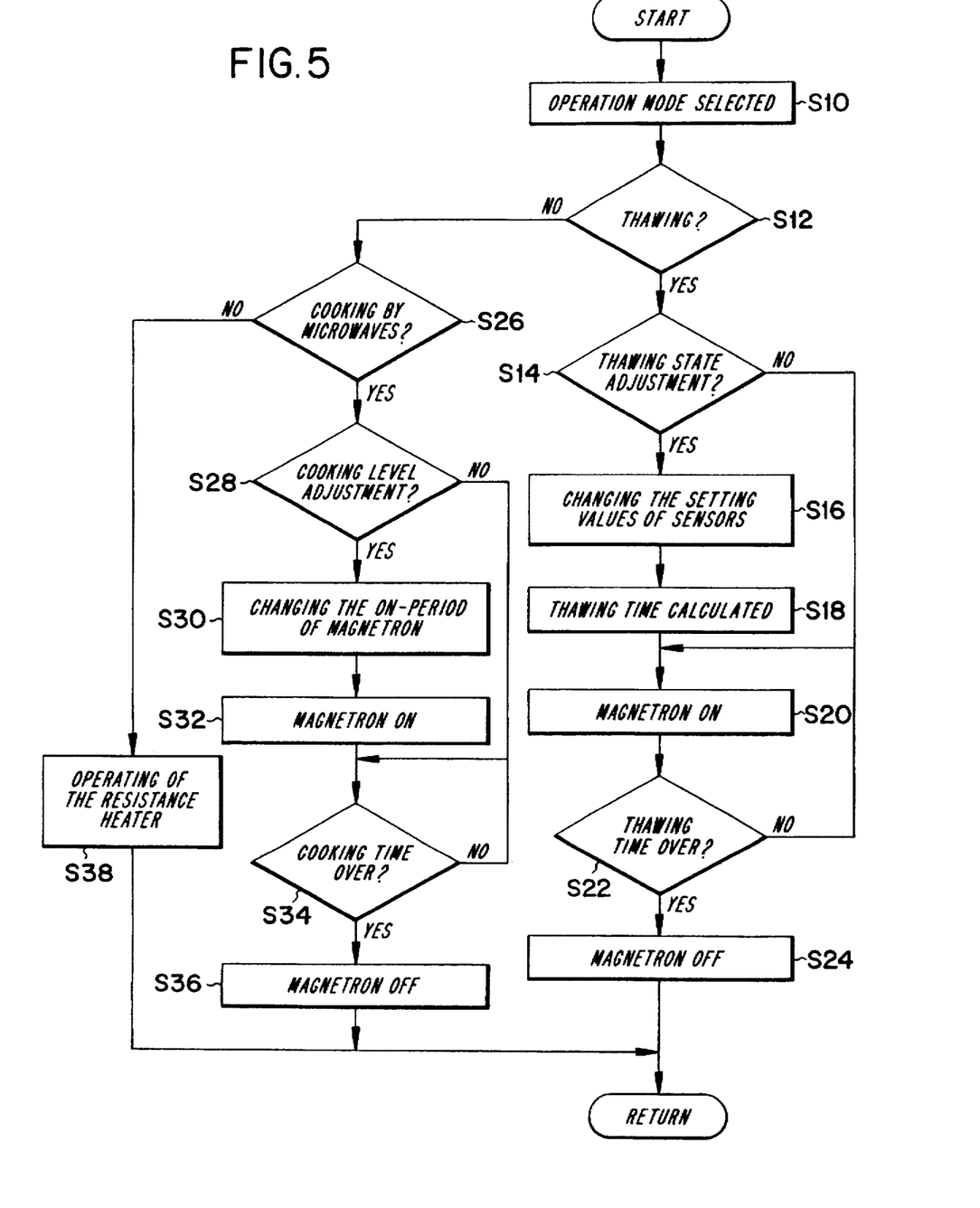
FIG. 5 is a flow chart of the control sequence of a microwave oven in thawing and cooking modes in accordance with the present invention.

A very general description of a method according to the invention will now be given, with reference to FIG. 5. The method includes the steps of putting a foodstuff to be cooked on the tray 12. Once power is applied to the microwave oven, one of the modes of operation is selected (S10) by pressing a prescribed button on the key operating portion 120 formed on the front of the microwave oven; determining (S12) if the selected cooking mode is a thawing mode; when a thawing mode is selected, determining (S14) if a thawing state control key of the key operating portion 120 has been selected; when a thawing state key which has been selected is other than for a standard thawing mode the associated thawing parameter is obtained by adjusting a standard thawing parameter by adding or subtracting a given variable and then performing a thawing operation until the adjusted parameter is satisfied (S20).

If the user had selected a standard thawing state at step 10 (e.g., by pressing a standard thawing state key or not pressing any thawing state key), the magnetron is actuated (S20) until the standard thawing parameter is satisfied.

The method also includes the steps of determining whether or not the particular thawing parameter is satisfied and, if not, continuously actuating (S22) the magnetron 16. When the thawing parameter has been satisfied, the magnetron is de-energized (S24) to complete the thawing mode. When the thawing mode is not selected in step 12, it is determined (S26) whether or not an oven cooking mode requiring the operation of the magnetron 16 is selected. When a magnetron cooking mode is selected, it is determined (S28) whether or not a cooking level control key is selected. When a level control key selected at step 28 is other than a standard cooking level, a standard operating level is adjusted (S30) in accordance with the user-selected level.

When a level control key is not selected at step 28 (or if a standard level key is selected) a standard cooking level is set; the magnetron 16 is actuated (S32) according to the standard (or adjusted) cooking level; and it is determined whether or not a preset cooling time has elapsed. If not, the magnetron is continuously actuated (S34), and when the cooking time is over, the magnetron 16 is de-energized (S36) to complete the cooking mode. When the microwave cooking mode is not selected at S26, the heater 17 is energized (S38).

The control sequence of the microwave oven in the thawing mode and microwave cooking mode will now be more fully described, again referring to FIG. 5.

First, once power is applied to the microwave oven, a user puts a foodstuff to be cooked on the tray 12 inside of the cooking chamber 11, and then selects (S10) one of the modes of operation by pressing a prescribed button of the key operating portion 120.

Second, the control portion 100 determines (S12) if the selected mode of operation is a thawing mode. When a thawing mode has been selected by the user, the control portion 100 determines (S14) whether or not a thawing level control key provided on the key operating portion 120 has also been selected. If the user selects, for example, a "standard thawing" key among full thawing, half thawing, and standard thawing keys (or if the user selects no thawing key), the control portion 100 sets a standard thawing parameter for achieving a standard food-thawing state. If a different thawing level key is selected (i.e., a key other than "standard thawing"), then the standard thawing parameter will be adjusted for achieving that different food thawing state. Examples of thawing parameters which can be used are: thawing time period, variation in food weight during thawing, and gases emitted during thawing.

If the thawing parameter being used is a thawing time period, then the weight of food on the tray is measured by the weight sensing mechanism 45, and a thawing time period is established as a function of the food weight. If a standard thawing state is selected (or if no thawing state is selected) at step S14, the magnetron is energized (S20) for a preselected time period representing a standard thawing time. If a different (non-standard) thawing state is selected, then the standard thawing time is adjusted (varied), i.e. increased or decreased depending upon whether the selected thawing state requires more or less thawing time. That is, the standard thawing time periods associated with respective food weights are changed (S16) to reflect the different thawing state that has been selected. Thus, when the food weight measurement is made, an adjusted (i.e., nonstandard) time period is calculated (S18). For instance, in the event that a full thawing state is selected, the thawing time period will be greater than the standard thawing time period. Likewise, if a half thawing state is selected, the thawing time period will be less than the standard thawing time.

If the thawing parameter is not a time period, but rather is a variation in the food weight occurring during thawing, the weight sensing mechanism 45 will monitor the weight of the food during the thawing operation to detect variations in that weight. It will be appreciated that there is a standard weight variation which is placed in effect if a standard thawing state key (or no key) is actuated at step 14, and the magnetron will be energized (S20) until that standard weight variation is detected. If a non-standard thawing key is selected, then a weight variation for achieving the selected thawing state will be obtained by adjusting the standard weight variation up or down, depending upon which of the non-standard thawing modes was selected.

Fourth, assuming that the thawing parameter is a time period, if the user does not select a thawing state control key at step S14, or if a thawing time has already been calculated at step S18, the control portion 100 actuates (S20) the magnetron 16 so as to apply microwave energy to the foodstuff in the cooking chamber 11.

Fifth, the control portion 100 determines whether or not the respective thawing time is over while the foodstuff is being thawed by the magnetron 16. If the thawing time is not over, the control portion 100 returns (S22) to step 20 to allow the magnetron 16 to go on operating. If the thawing time is over, the control portion 100 de-energizes (S24) the magnetron 16 so as to complete the thawing mode.

Sixth, when the thawing mode was not selected at step 12, the control portion 100 determines (S26) whether or not a microwave cooking mode was selected. If the microwave cooking mode was selected, the control portion 100 determines (S28) whether or not a non-standard cooking level control key was selected by the user.

If a non-standard cooking level control key was not selected at step 28, then the magnetron is energized (S32) to cook food at a standard level, wherein the magnetron is energized for only a portion of the cooking period, e.g. the magnetron could be energized for 23 seconds out of each 30-second cooking time period.

If a non-standard cooking level is selected, then the standard cooking level is adjusted accordingly.

The non-standard cooking levels may be characterized as long and short cooking levels. In the long cooking level, the magnetron is energized during the entire cooking period. In the short cooking level the magnetron is energized for less time than for the standard cooking level, e.g. for 16 seconds of each 30-second cooking period.

During the operation of the magnetron 16, the control portion 100 determines if the cooking time is over, and when the cooking time has not elapsed, the control portion 100 returns (S34) to step 32 in order to continue operating the magnetron 16. When the cooling time has elapsed, the control portion 100 de-energizes (S36) the magnetron 16.

When the control portion 100 determines that the microwave cooking mode requiring the operation of the magnetron 16 has not been selected by the user, the resistance heater 20 is energized (S38) for a predetermined period to time to perform cooking by convection and radiant heat.

Returning to the Fourth phase, and assuming that the thawing parameter is a variation in food weight, rather than a time period, if the user does not select a thawing state key, or if a weight variation has already been calculated, the control portion 100 actuates (S20) the magnetron 16 so as to apply microwave energy to the foodstuff in the cooking chamber. During the fifth phase, the control portion 100 determines whether or not the respective variation in food weight has occurred during the thawing operation. If not, the magnetron continues to operate. Otherwise, the magnetron is de-energized.

It is necessary for the tray 12 to be in a lowermost position in order to be weighed. Therefore, when the thawing parameter being used is food weight variation, the tray can be rotated, but not elevated, during the thawing operation. It would be possible, however to both elevate and rotate the tray if the thawing parameter is a time period or gaseous emissions.

If the thawing parameter is gaseous emissions, the magnetron is actuated during a thawing mode until the detected state of gaseous emissions correspond to the respective state of emissions for the particular thawing state which was selected.

It will be appreciated that the tray 12 can be elevated and/or rotated during the cooking period.

It will be appreciated that in accordance with the present invention, more than one food-thawing state can be achieved. Also, more than one microwave cooking level can be achieved.

Although the present invention has been described in connection with preferred embodiments thereof, it will be appreciated by those skilled in the art that additions, modifications and deletions not specifically described may be made without departing from the spirit and scope of the invention as defined in the appended claims.

What is claimed:

1. A method of automatically controlling a food-thawing operation of a microwave oven, the oven including a cooking chamber, a magnetron, and manual input means for selecting among various food-thawing states; the method comprising the steps of:

A) automatically determining whether a thawing mode has been selected by a user;

B) automatically determining whether a food-thawing state has been selected by the user from among a plurality of keys directed to respective thawing states comprised of a standard thawing state and non-standard thawing states, when a thawing mode has been selected in step A;

C) automatically setting a standard thawing parameter for achieving a standard food-thawing state when a standard food-thawing state is selected in step B;

D) automatically determining and setting a variation in the standard thawing parameter for achieving one of the non-standard food-thawing states if a non-standard food-thawing state is selected in step B; and E) automatically energizing the magnetron to perform a food-thawing operation until the thawing parameter for achieving the food thawing state selected in step B is reached.

2. The method according to claim 1 wherein step C includes setting the standard thawing parameter if no food-thawing state was selected in step B.

3. The method according to claim 1 wherein the standard food-thawing parameter comprises a thawing time period; step D including terminating the thawing operation when a thawing time period for achieving the thawing state selected in step B has elapsed.

4. The method according to claim 1 wherein the microwave oven includes a weight sensor for sensing the weight of food to be thawed; the standard thawing parameter comprising a variation in weight of the food being thawed; step D comprising monitoring a weight of the food during the thawing operation and terminating the thawing operation when a weight variation in the food for achieving the thawing state selected in step B is detected.

5. The method according to claim 1 wherein the non-standard thawing states include a full thawing state and a partial thawing state.

6. A method of controlling a food cooking operation of a microwave oven, the oven including a cooking chamber, a magnetron, and manual input means for selecting from among various food cooking levels; the method comprising the steps of:

A) automatically determining whether a microwave cooking mode has been selected by a user;

B) automatically determining whether a cooking level has been selected by the user from among a plurality of keys directed to respective cooking levels comprised of a standard cooking level, and non-standard cooking levels, when a microwave cooking mode has been selected in step A;

C) automatically setting a standard cooking level when a standard cooking level has been selected in step B, wherein the magnetron is energized for only a first extent of a cooking period;

D) automatically determining and setting a variation in the first extent of the cooking period during which the magnetron is energized, when a non-standard cooking level is selected in step B; and E) automatically energizing the magnetron to perform a food-cooking operation in which the magnetron is energized for the extent of the cooking period necessary to achieve a cooking level selected in step B.

7. The method according to claim 6 wherein the non-standard cooking levels include a long cooking level and a short cooking level, the magnetron being energized for the entire extent of the cooking period in the long cooking level, and being energized for a portion of the extent of the cooking period in the short cooking level which is less than the extent in the standard cooling level.

* * * * *